US008152185B2

(12) United States Patent
Siebeneick

(10) Patent No.: US 8,152,185 B2
(45) Date of Patent: Apr. 10, 2012

(54) WHEEL SUSPENSION

(75) Inventor: Jürgen Siebeneick, Oberwesel (DE)

(73) Assignee: GM Global Technology Operations LLC, Detroit, MI (US)

( * ) Notice: Subject to any disclaimer, the term of this patent is extended or adjusted under 35 U.S.C. 154(b) by 767 days.

(21) Appl. No.: 11/993,246

(22) PCT Filed: May 24, 2006

(86) PCT No.: PCT/EP2006/004937
§ 371 (c)(1),
(2), (4) Date: Dec. 20, 2007

(87) PCT Pub. No.: WO2006/136259
PCT Pub. Date: Dec. 28, 2006

(65) Prior Publication Data
US 2010/0320711 A1 Dec. 23, 2010

(30) Foreign Application Priority Data

Jun. 23, 2005 (DE) .......................... 10 2005 029 641

(51) Int. Cl.
*B60G 3/04* (2006.01)
*B60G 3/14* (2006.01)
*B62D 7/18* (2006.01)
(52) U.S. Cl. ...... 280/124.134; 280/124.142; 280/93.512
(58) Field of Classification Search ............... 267/140.5, 267/141.1, 141.2, 141.4, 220, 221; 280/86.756, 280/86.757, 86.758, 93.512, 124.125, 124.126, 280/124.13, 124.142, 124.146, 124.147, 280/124.15, 124.151, 124.154, 124.155
See application file for complete search history.

(56) References Cited

U.S. PATENT DOCUMENTS

| 0,234,504 | A |   | 11/1880 | Bennor |
| 3,827,711 | A | * | 8/1974  | Muller .................... 280/124.137 |
| 3,831,970 | A | * | 8/1974  | Muller .................... 280/124.137 |
| 3,926,454 | A |   | 12/1975 | Van Winsen |
| 4,341,396 | A |   | 7/1982  | Decouzon et al. |

(Continued)

FOREIGN PATENT DOCUMENTS
DE 2945802 A1 5/1980
(Continued)

OTHER PUBLICATIONS

Machine Translation of JP 06-211014.*
(Continued)

*Primary Examiner* — Joseph Rocca
(74) *Attorney, Agent, or Firm* — Ingrassia Fisher & Lorenz, P.C.

(57) ABSTRACT

A wheel is described in which the axle carrier is pivoted to a forked McPherson strut support, which in turn is joined with a McPherson strut on the one hand and a control arm on the other, wherein a dual bearing is present between the control arm and the forked McPherson strut support. The advantage to this is that the two bearings of the dual bearing can vary in stiffness, so that the resultant degree of freedom makes it possible to more exactly influence steering behavior, thereby enabling an improvement in the overall steering behavior of the vehicle. Even given an unchanged bearing bush stiffness by comparison to prior art, the greater distance between the bearing bushes and steering axis reduces the angle by which the forked McPherson strut supports can turn in the event of lateral forces.

8 Claims, 4 Drawing Sheets

U.S. PATENT DOCUMENTS

| | | | | |
|---|---|---|---|---|
| 4,744,586 | A | * | 5/1988 | Shibahata et al. ...... 280/124.143 |
| 4,844,505 | A | * | 7/1989 | Higuchi .................. 280/124.145 |
| 4,995,633 | A | | 2/1991 | Santo |
| 5,180,180 | A | * | 1/1993 | Yamashita et al. ............ 180/253 |
| 5,192,100 | A | * | 3/1993 | Rumpel et al. ......... 280/124.154 |
| 5,439,203 | A | * | 8/1995 | Hadano .................... 267/140.12 |
| 5,467,971 | A | * | 11/1995 | Hurtubise et al. ............ 267/220 |
| 6,116,627 | A | * | 9/2000 | Kawabe et al. .......... 280/124.15 |
| 6,131,932 | A | | 10/2000 | Bunker |
| 6,783,137 | B2 | * | 8/2004 | Nagreski et al. ......... 280/93.512 |
| 6,880,841 | B2 | | 4/2005 | Wang et al. |
| 7,490,840 | B2 | | 2/2009 | Luttinen et al. |
| 7,798,506 | B2 | * | 9/2010 | LeBlanc et al. ......... 280/124.135 |
| 2003/0057622 | A1 | * | 3/2003 | Bovio et al. .................... 267/281 |
| 2003/0234504 | A1 | * | 12/2003 | Frantzen .................. 280/93.512 |
| 2004/0026885 | A1 | | 2/2004 | Lin |
| 2004/0178596 | A1 | * | 9/2004 | Furutani et al. .......... 280/86.758 |
| 2005/0110235 | A1 | * | 5/2005 | LeBlanc et al. ......... 280/124.135 |

FOREIGN PATENT DOCUMENTS

| | | |
|---|---|---|
| DE | 4206896 A1 | 9/1993 |
| DE | 19720639 A1 | 11/1998 |
| DE | 19949452 | 5/2001 |
| DE | 10327554 A1 | 1/2005 |
| DE | 102008048178 A1 | 4/2010 |
| EP | 1319533 | 6/2003 |
| EP | 1582438 A1 | 10/2005 |
| FR | 2663266 | 12/1991 |
| JP | 06-211014 * | 8/1994 |

OTHER PUBLICATIONS

Machine Translation of DE19949452.*

Hun, H., et al., "Train avant pivot independant Front axe steering knuckle pivot," Ingenieurs de l'Automobile, No. 650, Sep. 1, 1989, pp. 140-141, XP000073062.

USPTO, Restriction Requirement issued in U.S. Appl. No. 11/159,645, dated Jan. 25, 2008.

Response to Restriction Requirement for U.S. Appl. No. 11/159,645, dated Feb. 25, 2008.

USPTO, Office Action issued in U.S. Appl. No. 11/159,645, dated May 15, 2008.

Response to Office Action for U.S. Appl. No. 11/159,645, dated Aug. 12, 2008.

USPTO, Notice of Allowance issued in Application No. 11/159,645, dated Jan. 25, 2008.

* cited by examiner

WHEEL SUSPENSION

CROSS-REFERENCE TO RELATED APPLICATIONS

This application is a U.S. National-Stage entry under 35 U.S.C. §371 based on International Application No. PCT/EP2006/004937 filed May 24, 2006, which was published under PCT Article 21(2) and which claims priority to German Application No. DE 10 2005 029 641.6, filed Jun. 23, 2005.

TECHNICAL FIELD

The invention relates to a wheel suspension system, in particular a front wheel suspension system for a motor vehicle with an axle carrier, which is mounted on a forked McPherson strut support so that it can swivel around a vertical steering axis in an upper and lower bearing, wherein the upper and lower bearing are incorporated in forked arms that project laterally from a base of the McPherson strut support, with a McPherson strut consisting of a spring and damper, which joins the McPherson strut support with the body of the vehicle to absorb the vehicle load, with a control arm that is respectively joined to the body on the one hand and the McPherson strut support on the other by means of a horizontal axle that essentially extends in the longitudinal direction of the vehicle.

BACKGROUND

A wheel suspension system is described in EP 1 319 533 A1. The control arm is here joined with the forked McPherson strut support as follows: The McPherson strut support exhibits two jaws that project from the lower forked arm, between which a bearing axis runs. The end of the control arm facing the McPherson strut support incorporates a bearing eye that envelops the bearing axis. Situated between the annular gap between the bearing eye and bearing axis is a bearing bush made out of rubber/plastic, which takes up the lateral forces that arise while cornering. In order to do so, the bush exhibits a certain level of stiffness.

However, this bush must prevent the McPherson strut support from rotating around an essentially vertical axis running through the middle of the bearing bush while steering, so that the steering axis remains clearly defined. While braking and driving, this bearing bush must also convey the torque in the control arm generated by the longitudinal forces while braking and driving over the distance between the steering axis and bearing bush middle, without allowing the bearing bush middle to noticeably rotate around an essentially vertical axis in the process. In addition, the bushes must take up the longitudinal forces attacking the wheel suspension system in the control arm. At the same time, this bearing bush must allow the McPherson strut support to tilt with the McPherson strut around an axis running through the middle of the bearing bush essentially horizontally transverse to the longitudinal direction of the vehicle, so as not to generate a constriction in the McPherson strut as the wheel moves elastically forward or backward, or during compression or rebounding.

Therefore, the object of the invention is to use simple means to improve wheel suspension along with the spring and damping behavior of the wheel suspension system during steering, braking and accelerating maneuvers.

SUMMARY

According to the invention, the object is achieved by mounting the control arm to the forked McPherson strut support using two spaced bearings, which lie in front and back of the steering axis relative to the traveling direction, and form a dual bearing.

The advantage to this is that these two bearings can vary in stiffness, so that the resultant degree of freedom makes it possible to more exactly influence steering behavior, thereby enabling an improvement in the overall steering behavior of the vehicle. Even given an unchanged bearing bush stiffness by comparison to prior art, the greater distance between the bearing bushes and steering axis reduces the angle by which the forked McPherson strut supports can turn in the event of lateral forces.

The dual bearing comprised of two bearings can be easily realized by having the lower forked arm of the McPherson strut supports be a compact extension, enveloped on both sides by a respective jaw of a forked end of the control arm. In this embodiment, the control arm jaws each accommodate a bearing eye, wherein the two bearing eyes are mounted on axle journals projecting from the extension. In another, preferred embodiment, the lower forked armor base of the forked McPherson strut support consists of two opposed, spaced sections, wherein the compact end of the control arm extends into the gap formed by the sections, wherein the bearing eyes are situated in the McPherson strut support sections, and two laterally projecting axle journals mounted inside the bearing eyes are located at the end of the control arm. The two journals can here consist of a continuous pin.

Since the dual bearing can move along the bearing axis, a stop plate with a suitable startup contour is located between the opposing surfaces on the control arm and on the McPherson strut support radially to the respective bearing axis in order to prevent damage. The stop plates are designed either as individual elements or as an integral component of the McPherson strut support or control arm.

The bearing bushes here also exhibit radially outwardly pointing flanges that project out of the bearing eye, which are made to abut the stop plate and serve as a rubber buffer.

The bearing bushes are here designed in such a way as to exhibit a high lateral stiffness and low stiffness perpendicular thereto, meaning in a vertical direction.

The two bearing bushes form a dual bearing, and are preferably designed as drag bearings.

As explained above, the axle carrier mounted on the forked McPherson strut supports exhibits an upper and lower bearing, wherein the upper bearing preferably consists of a bearing ball that lies in a footstep bearing in the upper forked arm of the forked McPherson strut support, and the lower bearing is designed as a drag bearing. Such an arrangement is relatively easy to assemble.

To give the wheel suspension system a caster, the steering axis is tilted to the back in the traveling direction. In general, the free adjustment of the steering axis relative to the alignment of the McPherson strut and the alignment of the McPherson strut to the body, as well as the adjustability of the steering parameters independently of the parameters for compression and rebounding kinematics can be regarded as an advantage to the present axle type.

The dual bearing used to mount the control arm to the forked McPherson strut support is preferably still located below the lower bearing of the axle carrier on the McPherson strut support. However, especially compact solutions are also conceivable, in which the dual bearing is situated between the two bearings of the axle carrier on the McPherson strut support.

BRIEF DESCRIPTION OF THE DRAWINGS

The invention will hereinafter be described in conjunction with the following drawings figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
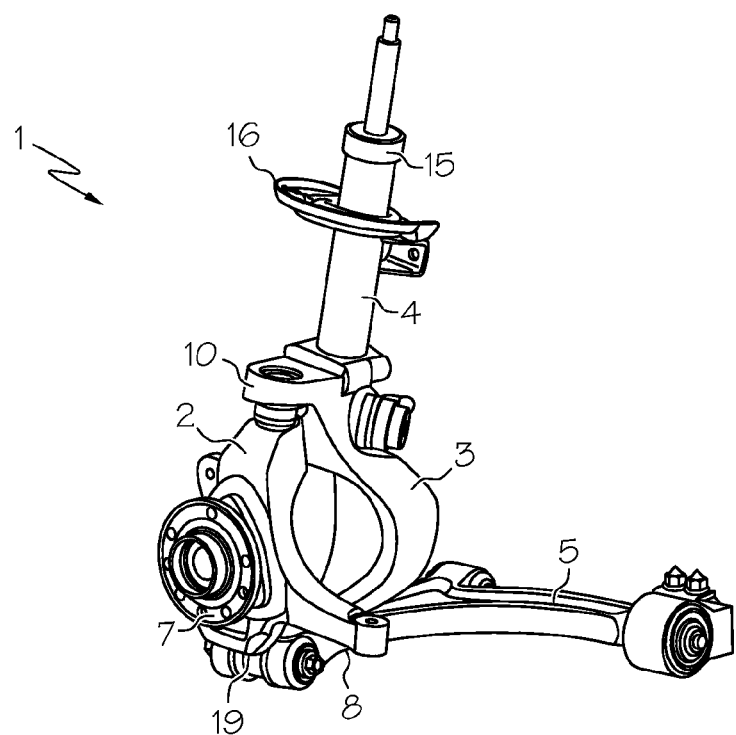
FIG. 1 is a perspective depiction of the wheel suspension system viewed from behind in the traveling direction.

Reference will first be made to FIG. 1. The wheel suspension system 1 consists of an axle carrier 2, a forked McPherson strut support 3, a McPherson strut 4 and a control arm 5. The axle carrier 2 is used to hold a wheel axle 6, which ends in a collar 7 to which the wheel rim is bolted. The axle carrier 2 also has a wishbone 8, which is connected with the steering gear. The forked McPherson strut support 3 has an upper forked arm with an upper bearing 10 for the axle carrier 2 at its upper end, and a lower forked arm with a lower bearing 11 (covered here) at its lower end. The base of the forked McPherson strut support 3 consists of two curved sections that leave open a space through which the driving axle for the wheel bearing is passed.

The upper end of the forked McPherson strut support is abutted by a McPherson strut 4, which essentially consists of a damper 15 as well as a receptacle 16 for a spring not shown here in any greater detail. The upper end of the McPherson strut 4 is joined in a known manner with the vehicle body, wherein the spring abuts the body, so that the vehicle load is conveyed to the wheel suspension system. The upper attachment of the McPherson strut 4 to the body is designed in such a way that the McPherson strut 4 can easily tilt in all directions.

Figure 2:
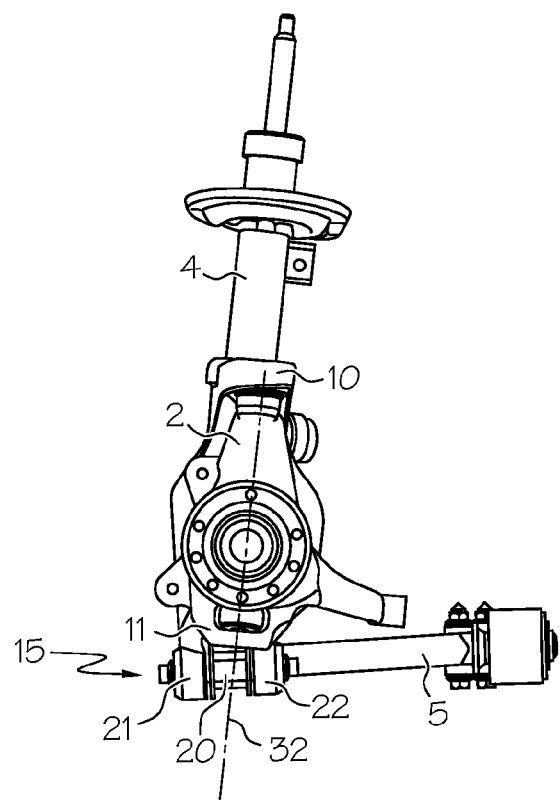
FIG. 2 is a side view of the wheel suspension system, looking at the axle carrier.

FIG. 2 shows a side view, wherein identical parts are labeled the same as in FIG. 1. As was already the case on FIG. 1, it is especially evident that the control arm 5 is distinctly wider at the body end, where it exhibits two bearings that secure it to the body or to a body frame in two drag bearings, the axes of which run in the longitudinal direction of the vehicle. The one bearing is located immediately behind the axle carrier viewed in the transverse direction, while the other bearing is situated behind the one bearing viewed in the traveling direction.

Figure 3:
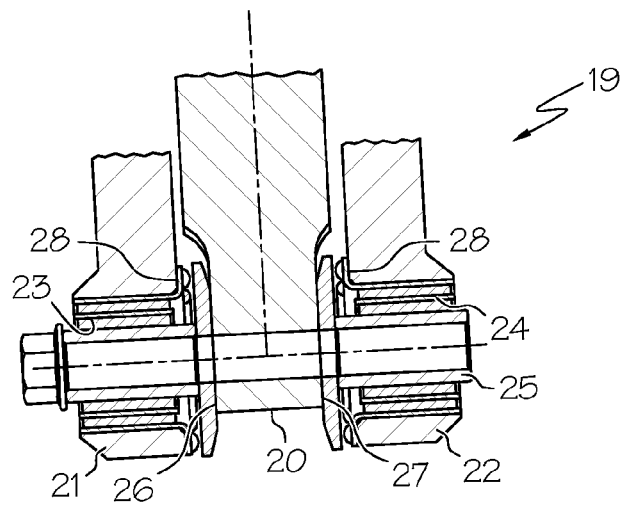
FIG. 3 is a detailed, sectional view of the control arm mounted to the axle carrier.

FIG. 3 presents a view of a dual bearing 19, with which the control arm 5 is secured to the forked McPherson strut support 3. To this end, the control arm 5 has a massive extension 20, either side of which has a respective jaw 21, 22 of the forked lower forked arm. The jaws 21, 22 each incorporate a bearing eye, each with a bearing bush 23, 24. Passing through the extension 20 is a bearing axis 25, whose axle journals projecting on either side of the extension accommodate the bearing bushes.

Figure 6:
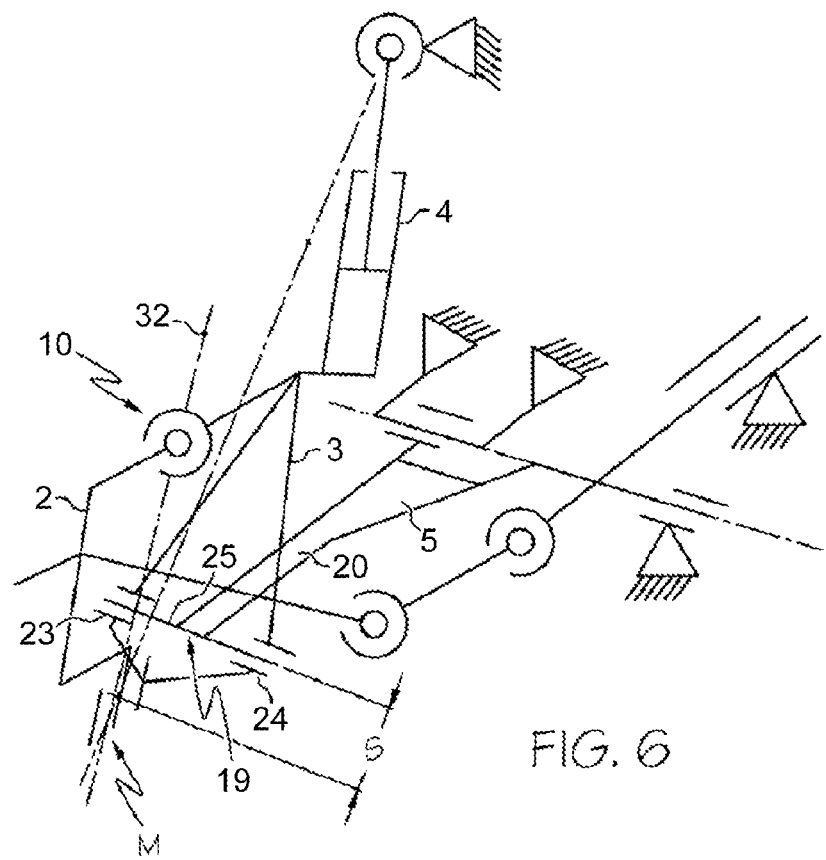
FIG. 6 is a schematic depiction of the wheel suspension system with a first form of the dual bearing, and on FIG. 7 is a schematic depiction of the wheel suspension system with a second form of the dual bearing.

Situated between the extension 20 and bearing eyes is a respective stop plate 26, 27, wherein the bearing bushes 23, 24 exhibit a radially outwardly projecting flange 28 that points to the extension and comes to abut the stop plates 26, 27. FIG. 6 presents a schematic view of this arrangement.

Figure 4:
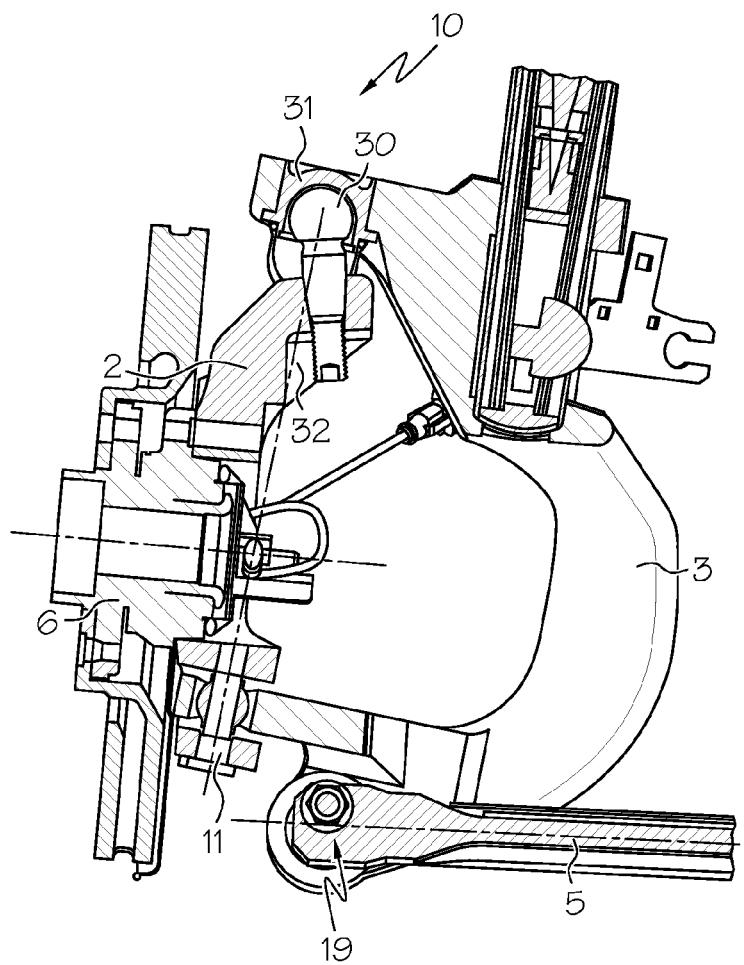
FIG. 4 is a partial section of the wheel suspension system in a plane transverse to the longitudinal axis of the vehicle.

FIG. 4 shows a cross section through the wheel suspension system. As evident, the upper bearing 10 consists of a bearing ball 30 in a bearing ball 30 in a footstep bearing 31 in the upper forked arm of the McPherson strut support 3, while the lower bearing 11 is a vertically aligned drag bearing. Other bearing types can basically also be integrated: For example, the upper ball-and-socket joint can be replaced by a two-row angular ball bearing unit, and the lower drag bearing can be replaced by a one-row spherical roller bearing or a simple slide bush. The steering axis 32 defined by the two bearings 10, 11 is tilted slightly inward.

The dual bearing 19 is slightly below and inwardly offset relative the lower bearing 11. If permitted by the position of the brake disk inside the wheel rim and steering angle approximation, the upper and lower bearing 10, 11 can also be spaced further apart, arranging the dual bearing 19 between them, vertically viewed. This solution is shown in perspective on FIG. 5, wherein FIG. 6 in turn schematically depicts the solution.

Figure 7:
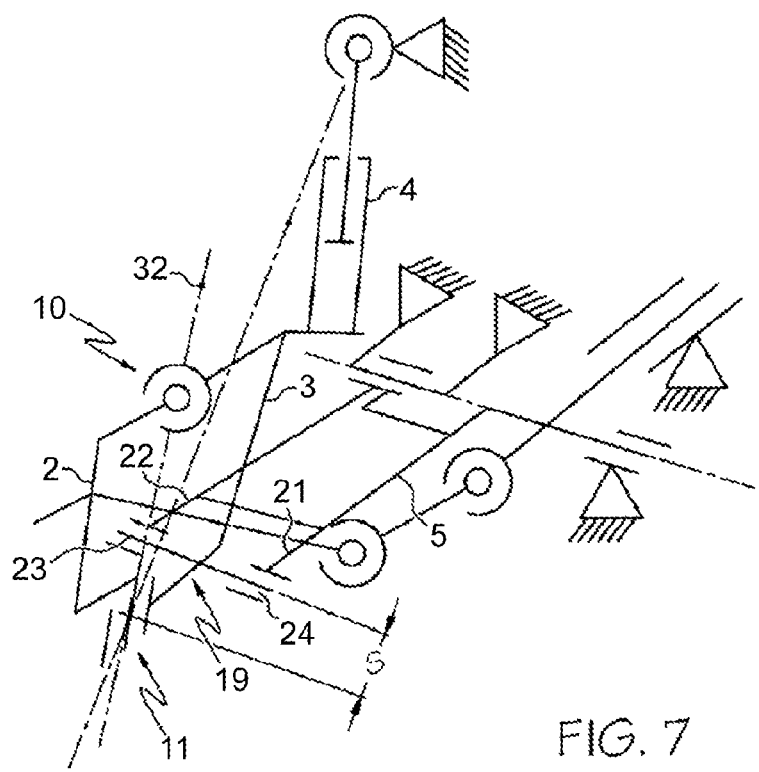

FIG. 7 provides a schematic view of a somewhat different arrangement of the dual bearing 19. In this embodiment, the end of the control arm 5 facing the dual bearing is forked, and forms two jaws 21, 22, between which the lower forked arm of the McPherson strut support 3 extends. The bearing eyes are formed in the jaws. Two journals extending into the bearing eyes project laterally from the lower forked arm, thereby forming the bearing axis 25 of the dual bearing 19.

Figure 5:
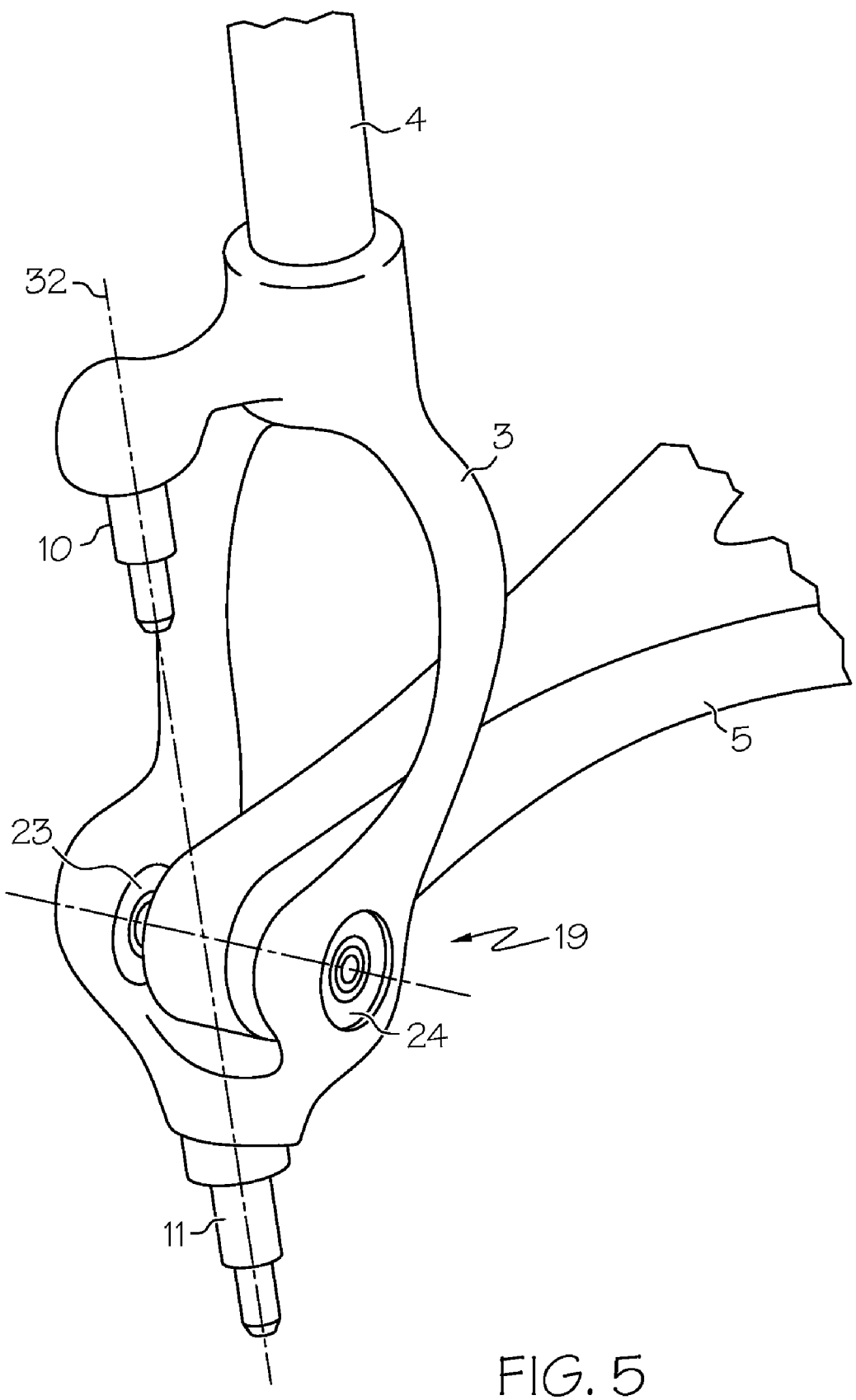
FIG. 5 is a perspective depiction of a second embodiment of the wheel suspension system.

For purposes of identifying the wheel suspension system components, corresponding parts are marked with the same reference numbers on FIGS. 5, 6 and 7.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A wheel suspension system for a motor vehicle, comprising:
    an axle carrier;
    a forked McPherson strut support having two opposed fork arms;
    an upper and lower bearing coupling the axle carrier to the forked McPherson strut support and permitting the axle carrier to swivel relative to the forked McPherson strut support about a steering axis;
    a McPherson strut having a lower end fixedly mounted to the McPherson strut support and configured to join the McPherson strut support with the body of the vehicle to absorb the vehicle load;
    a control arm having a first end rotatably coupled to the McPherson strut support and extending into a gap formed by the fork arms, and having a second end substantially opposite the first end, the second end having an increased width relative to the first end and adapted to be hingedly coupled to the body of the motor vehicle at two longitudinally-spaced locations to enable rotation of the control arm about an axis that essentially extends in the longitudinal direction of the vehicle; and two spaced bearings, which lie in front and back of the steering axis relative to the traveling direction, and form a dual bearing rotatably coupling the forked McPherson strut support to the first end of the control arm; wherein the control arm is received into said gap at a location vertically above said lower bearing of said axle carrier; wherein the dual bearing is arranged between the upper and lower bearing when vertically viewed.

2. The wheel suspension system according to claim 1, wherein one of the forked arms of the forked McPherson strut support has two opposing, spaced jaws, between which the first end of the control arm is located, wherein a respective bearing eye is formed in the jaws, the first end of the control arm mounted via bearing bushes to at least one of two axle journals laterally projecting from an end of the control arm.

3. The wheel suspension system according to claim 2, further comprising a stop plate situated between one of the two bearing eyes and the extension.

4. The wheel suspension system according to claim 3, wherein the bearing bushes additionally exhibit radially outwardly pointing flanges that project out of the bearing eye, which are made to abut the stop plate and serve as a rubber buffer.

5. The wheel suspension system according to claim 4, wherein the bearing bushes exhibit a high lateral stiffness and low stiffness perpendicular thereto.

6. The wheel suspension system according to claim 1, wherein the upper bearing comprises a bearing ball.

7. The wheel suspension system according to claim 6, wherein the steering axis is tilted to the back in the traveling direction.

8. The wheel suspension system according to claim 7, wherein the steering axis is inwardly tilted and aligned parallel to the McPherson strut.

* * * * *